United States Patent [19]
Bybee

[11] Patent Number: 5,531,098
[45] Date of Patent: Jul. 2, 1996

[54] HYBRID INFLATOR TESTING TANK

[75] Inventor: Steven D. Bybee, Roy, Utah

[73] Assignee: Morton International, Inc., Chicago, Ill.

[21] Appl. No.: 456,034

[22] Filed: May 31, 1995

[51] Int. Cl.[6] ............................................. G01N 33/22
[52] U.S. Cl. ............................................................. 73/35.17
[58] Field of Search ............................ 73/865.6, 865.9, 73/35.14, 35.17, 167; 248/542, 213.2, 316.6, 510

[56] References Cited

U.S. PATENT DOCUMENTS

| | | | |
|---|---|---|---|
| 2,448,203 | 8/1948 | Africano | 73/35.14 |
| 3,820,435 | 6/1974 | Rogers et al. | 73/35.17 |
| 5,467,379 | 11/1995 | Bybee et al. | 378/57 |

Primary Examiner—Robert Raevis
Attorney, Agent, or Firm—George W. Rauchfuss, Jr.; Gerald K. White

[57] ABSTRACT

A testing tank for securing and enclosing a plurality of gas discharge ports of a hybrid inflator during test firing of the inflator, the testing tank having a tank container, a lid and an adaptor system. The tank container has an open top communicating with an enclosed test chamber while the lid covers the opening in the tank container and has an aperture communicating with the test chamber through the opening. The adaptor system has an adaptor ring secured to the testing tank surrounding the opening, and an inflator housing having a sleeve-like body fitting within the adaptor ring. The inflator housing is snugly positionable around a hybrid inflator so that the cylindrical sidewall of the hybrid inflator will extend into the test chamber of the testing tank with the gas discharge ports located therein. Sealing means and securing means secure the gas discharge ports of the hybrid inflator within the test chamber in a gas-tight manner.

20 Claims, 4 Drawing Sheets

HYBRID INFLATOR TESTING TANK

FIELD OF THE INVENTION

The present invention relates to a testing tank for partially enclosing and securing a hybrid airbag inflator during test firing of the inflator and, more specifically, an adaptor ring and inflator housing for enclosing and securing the gas discharge ports of a hybrid airbag inflator within a testing tank during test firing of the inflator.

BACKGROUND OF THE INVENTION

Adapting existing testing tanks, made for enclosing pyrotechnic airbag inflators during test firing of the inflators, for use with hybrid inflators would be advantageous and useful, saving time and money. For quality control and research and development purposes, manufacturers routinely test fire airbag inflators. To provide a safe containment and to accurately observe and measure the results of a test firing, the inflators are contained within a testing tank during test firing.

The testing tank normally encloses a test chamber and has an open top that communicates with the test chamber. A lid is used to seal the open top, with means to secure the lid to the testing tank in a gas-tight manner. Sealing the tank in a gas-tight manner is necessary so that properties such as gas contents and gas pressure may be observed. The testing tank may also include tools and apparatus for measuring and recording the results of the test firings.

Pyrotechnic inflators normally have had a plurality of gas discharge ports evenly distributed about the sidewall of the inflator. The even distribution of the gas discharge ports allows pyrotechnic inflators to remain at rest during test firings and, therefore, a pyrotechnic inflator does not have to be secured but only enclosed within a testing tank during test firing.

Hybrid inflators normally have a cylindrical sidewall terminating at one end in a plurality of gas discharge ports. The placement of the gas discharge ports at one end can cause a hybrid inflator to be propelled like a missile during test firings. A hybrid inflator, therefore, must be secured during test firings in addition to being enclosed within a testing tank.

Adapting existing testing tanks for use with the hybrid inflators would be useful. The testing tanks would have to be adapted to secure the hybrid inflators while enclosing the plurality of gas discharge ports within the test chamber of the testing tank in a gas-tight manner. Using existing equipment and modifying the testing tank as little as possible would reduce costs and save time.

SUMMARY OF THE INVENTION

A principal object, therefore, of the present invention is to provide a testing tank for testing hybrid inflators.

Another object of the present invention is to provide an adaptor system for securing the gas discharge ports of a hybrid inflator within the test chamber of a testing tank in a gas-tight manner.

An additional object of the present invention is to use existing equipment and to modify existing testing tanks for testing hybrid inflators in order to reduce costs and save time.

A further object of the present invention is to provide a method for securing the gas discharge ports of a hybrid inflator within the test chamber of a testing tank in a gas-tight manner.

In carrying out this invention, there is provided an adaptor system for securing a hybrid inflator, having a sidewall terminating at one end in a plurality of gas discharge ports, partially within a test chamber of a testing tank having an opening communicating with the test chamber. The adaptor system comprises an adaptor housing that is securable to the testing tank surrounding the opening. The adaptor housing has a sleeve-like body fitable within the opening of the testing tank, and a peripheral flange extending radially outward from the cylindrical sleeve-like body for overlying the opening and a portion of the testing tank surrounding the opening. The sleeve-like body of the adaptor housing is snugly positionable around the hybrid inflator so that a portion of the sidewall of the hybrid inflator would extend through the opening in the testing tank and into the test chamber with the plurality of gas discharge ports located within the test chamber of the testing tank.

The adaptor system of the present invention includes means for providing a gas-tight seal between the adaptor housing and the testing tank, means for providing a gas-tight seal between the sleeve-like body of the adaptor housing and the sidewall of the hybrid inflator, means for securing the sleeve-like body of the adaptor housing within the opening of the testing tank and means for securing the hybrid inflator within the sleeve-like body of the adaptor housing.

According to another aspect of the present invention, the adaptor system comprises an adaptor ring and an inflator housing. The adaptor ring is securable to the testing tank surrounding the opening, while the inflator housing has a cylindrical sleeve-like body fitting within the adaptor ring and a peripheral flange extending radially outward from the cylindrical sleeve-like body over at least a portion of the adaptor ring. The cylindrical sleeve-like body is sized to be snugly positionable around the hybrid inflator so that a portion of the cylindrical sidewall of the hybrid inflator would extend through the adaptor ring, the opening in the testing tank and into the test chamber with the plurality of gas discharge ports located within the test chamber of the testing tank.

This adaptor system of the present invention includes means for providing a gas-tight seal between the adaptor ring and the testing tank, means providing a gas-tight seal between the adaptor ring and the inflator housing, means for providing a gas-tight seal between the sleeve-like body of the inflator housing and the cylindrical sidewall of the hybrid inflator, means for securing the inflator housing within the adaptor ring and means for securing the hybrid inflator within the sleeve-like body of the inflator housing.

According to an additional aspect of the invention, a testing tank for partially enclosing and holding the hybrid inflator is provided. The testing tank includes a tank container and a lid in addition to the adaptor system. The tank container encloses a test chamber and has an open top communicating with the test chamber. The lid covers the open top in the tank container and has an aperture communicating with the test chamber through the open top. The testing tank also has means providing a gas-tight seal between the tank container and the lid. As outlined above, the adaptor system containing the hybrid inflator would attach to the lid surrounding the aperture so that a portion of the cylindrical sidewall of the hybrid inflator would extend through the adaptor ring, the aperture in the lid, the open top in the testing tank and into the test chamber with the plurality of gas discharge ports located within the test chamber of the testing tank.

According to a further aspect of the invention, a method for securing and partially enclosing a hybrid inflator for testing thereof is provided. The method includes providing a hybrid inflator having a plurality of gas discharge ports at one end thereof, and providing a testing tank having an opening communicating with an enclosed test chamber. The hybrid inflator is secured within the opening of the testing tank in a gas-tight manner so that the plurality of gas discharge ports are located within the enclosed test chamber.

The present invention, therefore, provides a testing tank, an adaptor system and a method for securing the gas discharge ports of a hybrid inflator within the test chamber of the testing tank in a gas-tight manner for test firing the inflator. In addition, the present invention uses existing equipment and existing testing tanks, thereby reducing costs and saving time.

The invention together with further objects, features, advantages and aspects thereof, will be more clearly understood from the following description taken in connection with the accompanying drawings.

BRIEF DESCRIPTION OF THE DRAWINGS

The same reference numerals refer to the same elements throughout the various figures.

DETAILED DESCRIPTION OF THE INVENTION

The present invention is directed to a hybrid inflator testing tank incorporating an adaptor ring and an inflator housing. The testing tank also incorporates a tank container, a lid, sealing means and securing means. Other parts of a testing tank and hybrid inflator including the particular elements of a hybrid inflator, how an inflator generates gas and the tools and apparatus mounted on the testing tank for recording and analyzing test firings are all known in the art and, accordingly, are not described in detail as they do not in themselves constitute features of the present system. Only the components of a testing tank according to the present invention, including a tank container, a lid, an adaptor ring, an inflator housing, sealing means, securing means and exterior portions of a hybrid inflator as they relate to the instant invention will be described in detail.

Figure 1:
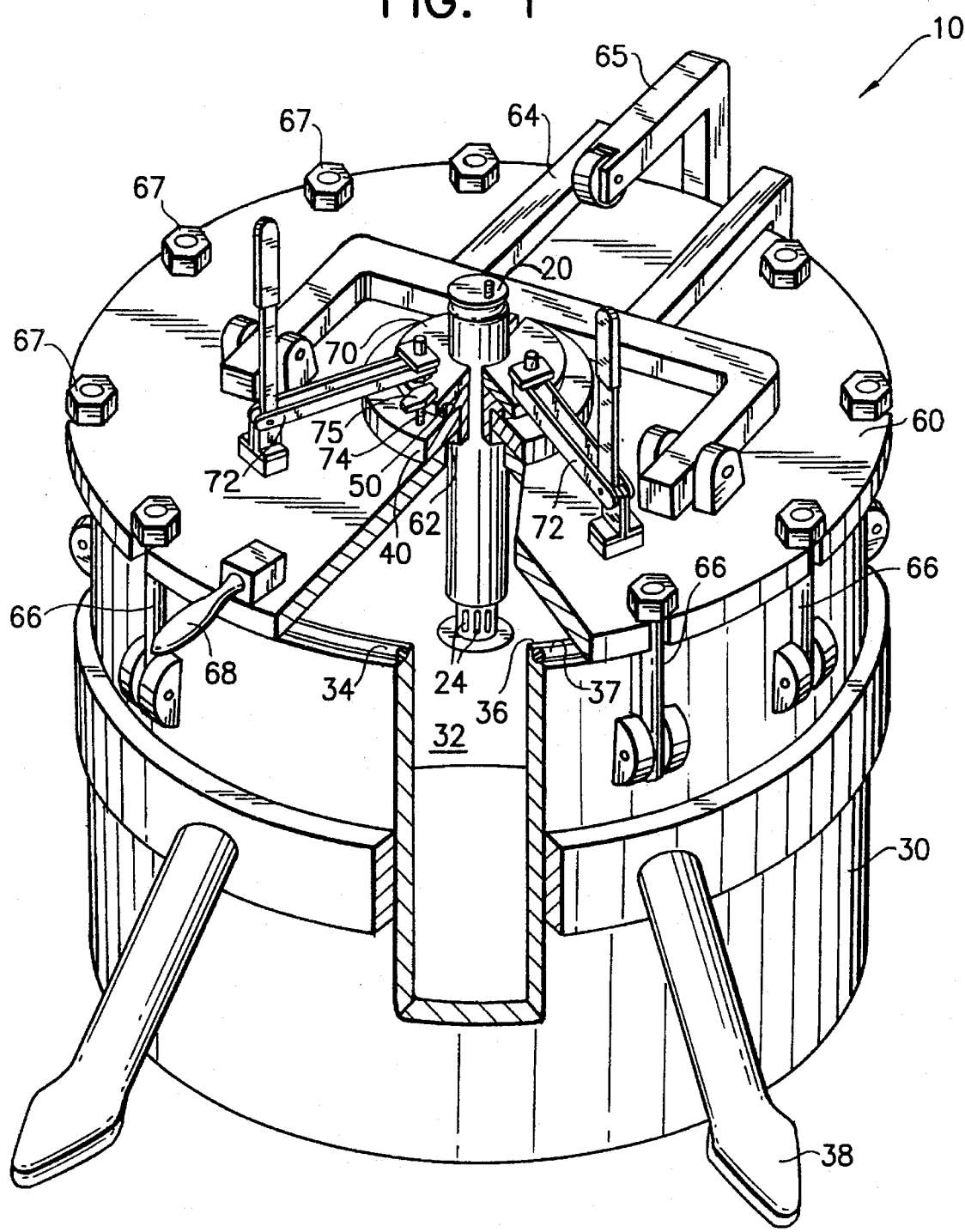
FIG. 1 is a side elevation view, partially in section, of a testing tank of the present invention securing and partially enclosing a hybrid inflator.
Figure 2:
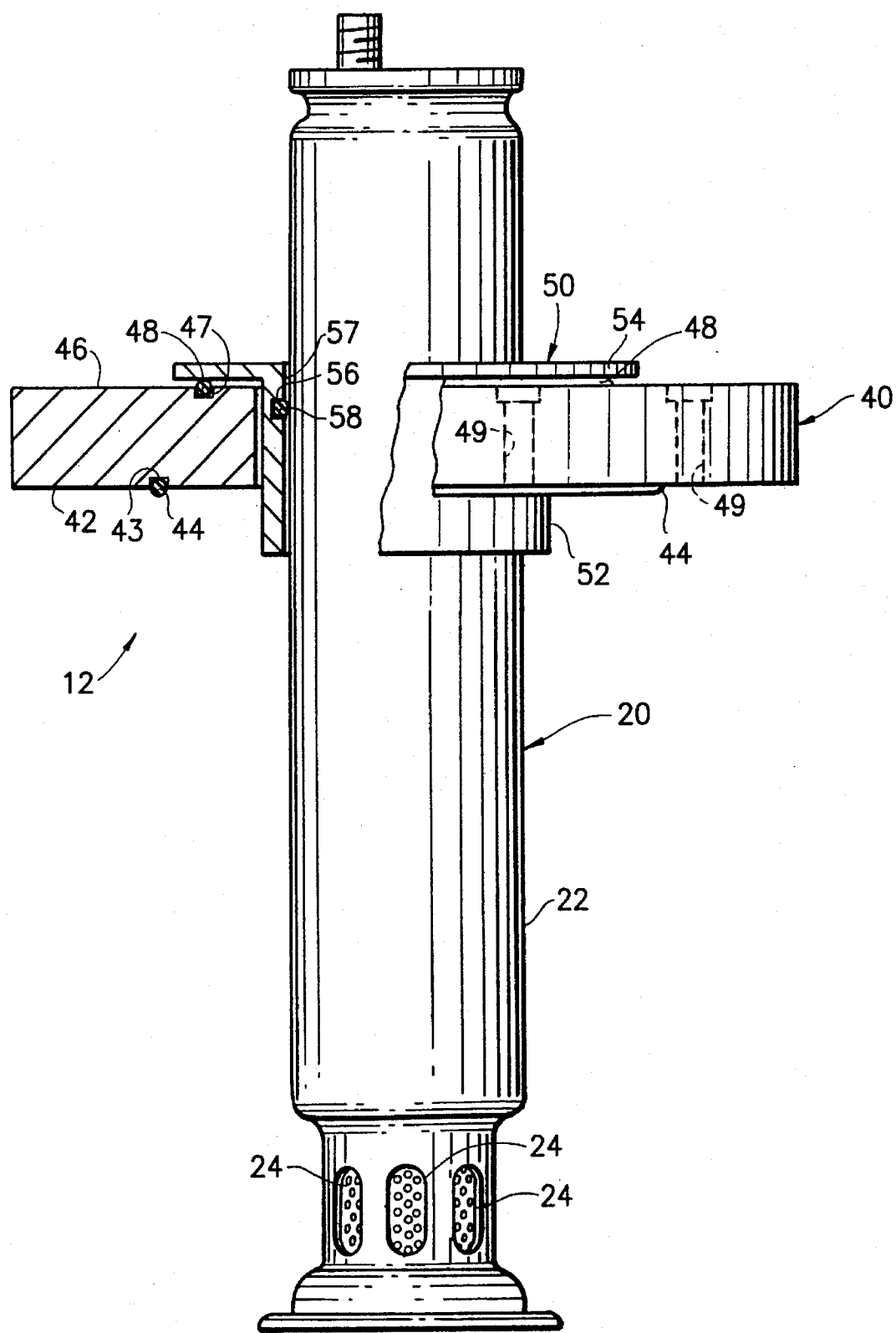
FIG. 2 is a side elevation view, partially in section, of a portion of an adaptor system of the present invention surrounding a hybrid inflator.
Figure 3:
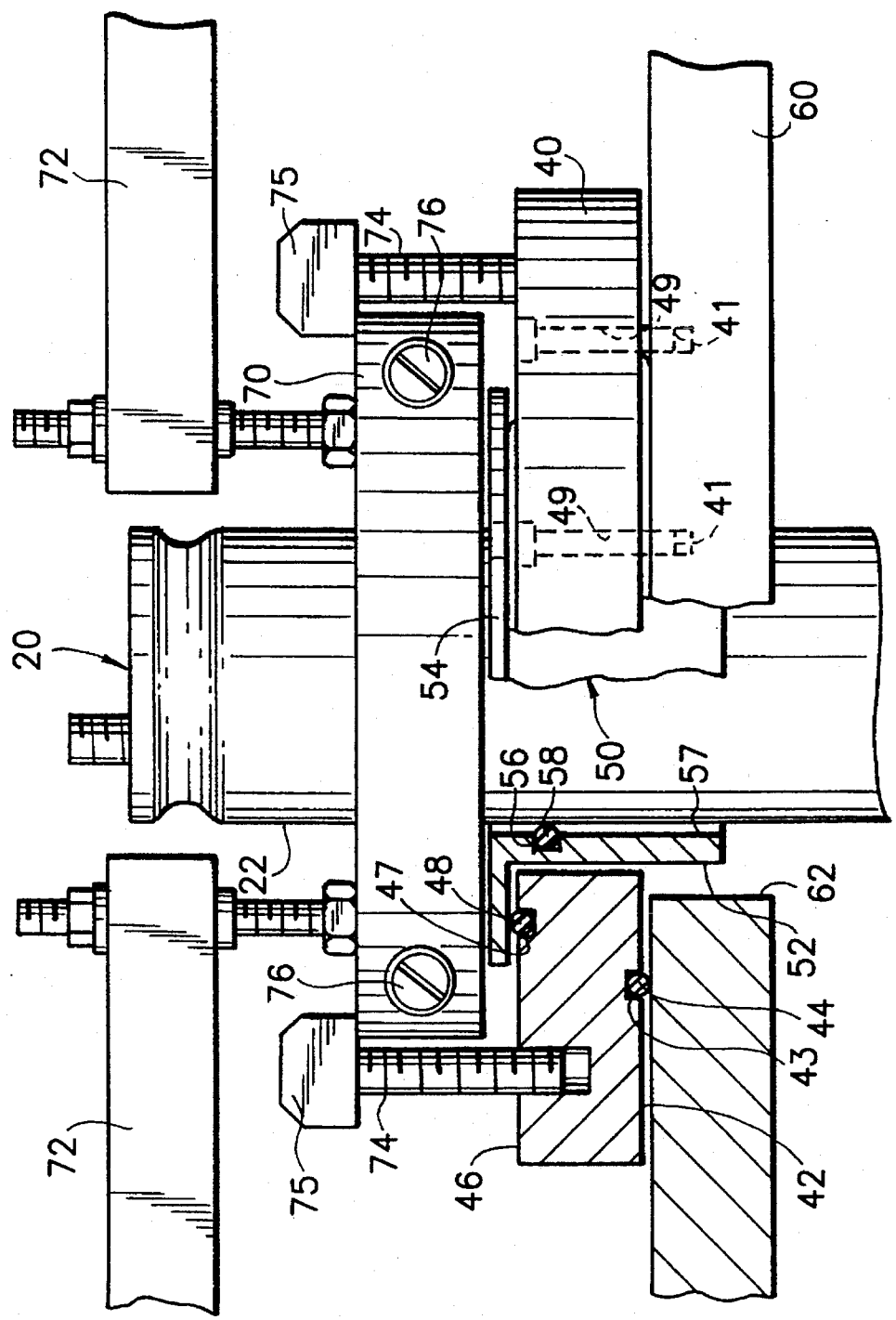
FIG. 3 is a side elevation view, partially in section, of the adaptor system of FIG. 2 and a portion of the testing tank of FIG. 1 securing and partially enclosing a hybrid inflator.

Normally, existing testing tanks include only a tank container and a lid. Referring first to FIGS. 1, 2 and 3, a hybrid inflator testing tank of the present invention is generally represented by the reference numeral 10 and includes a tank container 30, a lid 60, and an adaptor system, generally represented by the reference numeral 12. The testing tank 10 partially encloses and secures a hybrid inflator 20, having a cylindrical sidewall 22 terminating at one end in a plurality of gas discharge ports 24, for test firing of the inflator 10.

The tank container 30, normally made of stainless steel, encloses a test chamber 32, and has an opening or open top 34 that communicates with the test chamber 32. The tank container 30 may also include a tank stand 38 or other similar means for support. The lid 60 covers the open top 34 and a tank o-ring 37 contained within a tank opening annular groove 36 seals the lid 60 and the open top 34 in a gas-tight manner. The lid 60 has an aperture 62 communicating with the test chamber 32 through the open top 34.

The lid 60 further includes a hinge 64 pivotally connected to the tank container 30 and pivotally connected to the lid 60. A pivot arm 65 is fixedly connected to the tank container 30 and acts to pivot the lid 60 open when the hinge 64 is swung back. A lid handle 68 may be provided to aid in opening the lid 60, which is normally made of stainless steel and therefore relatively heavy. Once closed, the lid 60 is secured to the tank container 30 by a plurality of lid fasteners which may comprise toggle bolts 66 pivotally attached to the tank container 30 and terminating in nuts 67. The tank container 30 and lid 60 may further include access orifices, inlets, releasable pressure valves and other similar means for mounting tools and apparatus to analyze test firings.

The adaptor system 12 includes an adaptor ring 40 and an inflator housing 50. The adaptor ring 40 is secured to the lid 60 surrounding the aperture 62 by a plurality of adaptor ring fasteners which may comprise bolts 41 extending through bolt holes or openings 49 in the adaptor ring 40 and threadedly received in the lid 60. As shown, the adaptor ring 40 may also include a bottom o-ring 44 positioned in a bottom annular groove 43 located on a bottom surface 42 of the adaptor ring 40 comprising means for providing a gas-tight seal between the adaptor ring 40 and the lid 60. The bottom o-ring 44 attached to the adaptor ring 40 could, alternatively, be seated in a similar annular groove located on the lid 60. Furthermore, in a simplified variation of the testing tank 10, the testing tank 10 may include a tank container 30, having an opening 34, without a lid 60. In that case, the adaptor system 12 would attach directly to the tank container 30 surrounding the opening 34.

The inflator housing 50 has a cylindrical sleeve-like body 52 slidably fitting within the adaptor ring 40 and a peripheral flange 54 extending radially outward from the cylindrical sleeve-like body 52 over at least a portion of the adaptor ring 40. The cylindrical sleeve-like body 52 is snugly positionable around the hybrid inflator 20 so that a portion of the cylindrical sidewall 22 of the hybrid inflator would extend through the adaptor ring 40, the aperture 62 in the lid 60, the opening 34 in the tank container 30 and into the test chamber 32 with the plurality of gas discharge ports 24 located within the test chamber 32.

The adaptor ring 40 further includes a top surface 46 having a top annular groove 47 with a top o-ring 48 seated therein. The peripheral flange 54 of the inflator housing 50 covers the top o-ring 48 of the adaptor ring 40, to form a gas-tight seal between the adaptor ring 40 and the inflator housing 50. Alternatively, the top o-ring 48 could also be seated in a similar annular groove located on the flange 54. The sleeve-like body 52 of the inflator housing 50 further includes an inner annular groove 56 on an inner surface 57 of the cylindrical sleeve-like body 52 with a housing o-ring 58 seated therein to form a gas-tight seal between the inner surface 57 of the sleeve-like body 52 of the inflator housing 50 and the cylindrical sidewall 22 of the hybrid inflator 20.

A split ring 70 is positioned over the peripheral flange 54 of the inflator housing 50 and includes tightening means 76, which may comprise screws or bolts 76, for compressing two semi-circular halves of the split ring 70 around the cylindrical sidewall 22 of the hybrid inflator 20. The split ring 70 is held down by a plurality of safety bolts 74, having enlarged heads 75, secured to the adaptor ring 40 and a plurality of toggle clamps 72 secured to the lid 60 surrounding the split ring 70. The split ring 70 in combination with the safety bolts 74 and toggle clamps 72 secures the inflator housing 50 within the adaptor ring 40 and, furthermore, secures the hybrid inflator 20 within the sleeve-like body 52 of the inflator housing 50.

Figure 4:
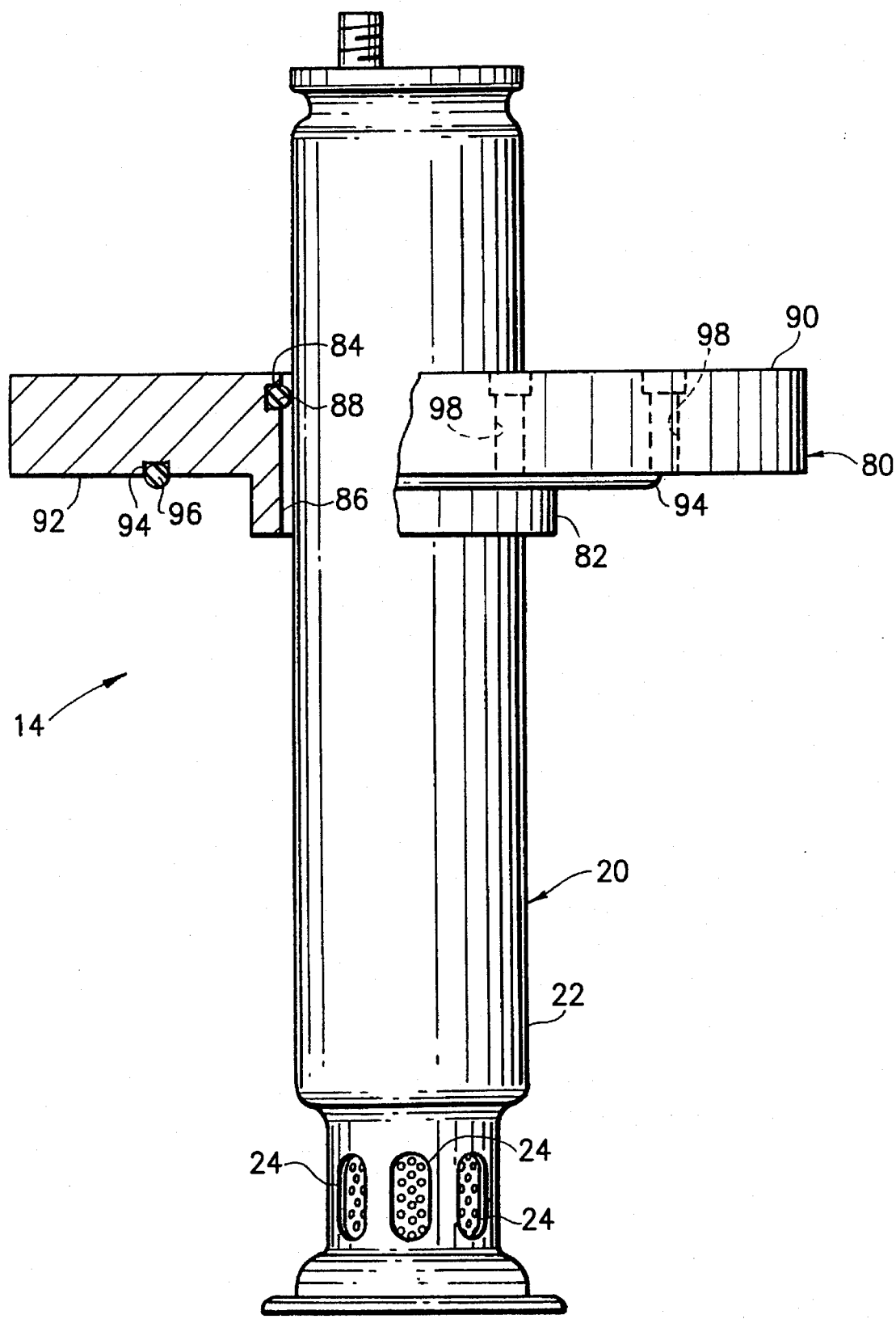
FIG. 4 is a side elevation view, partially in section, of another adaptor system of the present invention.

As shown in FIG. 4, the adaptor system, generally represented by the reference numeral 14, could comprise an integral adaptor housing 80 combining the adaptor ring 40 and inflator housing 50 of the adaptor system 12 of FIGS. 1 through 3. The adaptor housing 80 includes a cylindrical sleeve-like body 82 and a peripheral flange 90. The sleeve-like body 82 has an inner annular groove 84 on an inner surface 86 and a housing adaptor o-ring 88 seated therein for providing a gas-tight seal between the inner surface 86 of the sleeve-like body 82 and the cylindrical sidewall 22 of the inflator 20. The peripheral flange 90 has a bottom surface 92 having a bottom annular groove 94 containing a bottom o-ring 96 therein for providing a gas-tight seal between the adaptor housing 80 and the lid 60 of the testing tank 10. The peripheral groove 90 also has a plurality of bolt holes or openings 98 so that the adaptor housing 80 may be secured to the lid 60 with the plurality of bolts (not shown).

Referring again to FIGS. 1 through 3, to prepare for a test firing the lid 60 is first closed, enclosing the test chamber 32, and the plurality of lid fasteners 66 are engaged to secure the lid 60 to the tank container 30 with the tank o-ring 37 sealing the test chamber 32 in a gas-tight manner. The adaptor ring 40 is secured to the lid 60 surrounding the aperture 62 with the plurality of adaptor ring fasteners 41, the bottom o-ring 44 creating a gas-tight seal between the adaptor ring 40 and the lid 60.

The inflator housing 50 is slid onto the hybrid inflator 20 to be test fired with the housing o-ring 58 creating a gas-tight seal between the inner surface 57 of the sleeve-like body 52 and the sidewall 22 of the inflator 20. Enclosing the inflator 20 therein, the sleeve-like body 52 of the inflator housing 50 is inserted into the adaptor ring 40 with the sidewall 22 of the inflator 20 extending through the adaptor ring 40, the aperture 62 in the lid 60, the open top 34 in the tank container 30 and into the test chamber 32 so that the plurality of gas discharge ports 24 are contained within the test chamber 32.

The peripheral flange 54 extends over the adaptor ring 40 to cover the top o-ring 48 so that the top o-ring creates a gas-tight seal between the adaptor ring 40 and the inflator housing 50. As outlined, the housing o-ring 58, top o-ring 48, bottom o-ring 44 and the tank o-ring 37, in combination, seal the gas discharge ports 24 of the hybrid inflator 20 within the test chamber 32 of the testing tank 10 in a gas-tight manner.

The split ring 70 is then slid over the portion of the inflator 20 extending out of the testing tank 10 to rest on the peripheral flange 54 of the inflator housing 50. Split ring fasteners 76 connecting the two halves of the split ring 70 are tightened to clamp the split ring 70 around the sidewall 22 of the inflator 20. The plurality of safety bolts 74 attached to the adaptor ring 40 surrounding the split ring 70 are screwed down so that the enlarged heads 75 catch the edge of the split ring 70, securing the split ring 70. The toggle clamps 72 attached to the lid 60 surrounding the split ring are clamped down onto the split ring 70 further securing the split ring. As outlined, the split ring 70, split ring fasteners 76, toggle clamps 72 and safety bolts 74, in combination, secure the inflator housing 50 within the adaptor ring 40 and the inflator 20 within the inflator housing 50 so that the plurality of gas discharge ports 24 are secured within the test chamber 32.

A testing tank according to the present invention may also include other changes and modifications without departing from the true spirit and scope of the present invention. For example, the testing tank 10, which is reusable, may be provided with adaptor systems fitting different types and sizes of hybrid inflators. In addition, the testing tank 10 and adaptor system 12 or 14 of the present invention may include other suitable means for providing gas-tight seals and for securing the adaptor system 12 or 14 to the testing tank 10 and the inflator 20 within the adaptor system 12 or 14.

As shown, the present invention provides a testing tank and an adaptor system for securing the gas discharge ports of a hybrid inflator within the test chamber of a testing tank in a gas-tight manner for test firing the inflator. In addition, the present invention uses existing equipment and existing testing tanks, thereby reducing costs and saving time.

Since other requirements and environments varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

I claim:

1. A hybrid inflator assembly for use with a testing tank defining a testing chamber and an opening communicating with the testing chamber, the assembly comprising:

a hybrid inflator having a cylindrical sidewall terminating at one end in a plurality of gas discharge ports;

an adaptor housing having a cylindrical sleeve-like body sealingly fitable within the opening of the testing tank and a peripheral flange extending radially outward from the cylindrical sleeve-like body securable to the testing tank surrounding the opening, the sleeve-like body of the adaptor housing sealingly positioned around the cylindrical sidewall of the hybrid inflator so that a portion of the sidewall of the hybrid inflator would extend through the opening in the testing tank and into the test chamber with the plurality of gas discharge ports located within the test chamber of the testing tank.

2. An adaptor system for securing a hybrid inflator, having a cylindrical sidewall terminating at one end in a plurality of gas discharge ports, partially within a test chamber of a testing tank having an opening communicating with the test chamber, the adaptor system comprising:

an adaptor housing having a cylindrical sleeve-like body sealingly fitable within the opening of the testing tank and a peripheral flange extending radially outward from the cylindrical sleeve-like body securable to the testing tank surrounding the opening, the sleeve-like body of the adaptor housing sealingly positionable around the cylindrical sidewall of the hybrid inflator so that a portion of the sidewall of the hybrid inflator would extend through the opening in the testing tank and into the test chamber with the plurality of gas discharge ports located within the test chamber of the testing tank;

means for providing a gas-tight seal between the adaptor housing and the testing tank; and means for providing a gas-tight seal between the sleeve-like body of the adaptor housing and the sidewall of the hybrid inflator.

3. The adaptor system of claim 2 further comprising:

means for securing the hybrid inflator within the sleeve-like body of the adaptor housing.

4. A hybrid inflator assembly for use with a testing tank defining a testing chamber and an opening communicating with the testing chamber, the assembly comprising:

a hybrid inflator having a cylindrical sidewall terminating at one end in a plurality of gas discharge ports;

an adaptor ring sealingly securable to the testing tank over the opening; and an inflator housing having a cylindrical sleeve-like body sealingly fitting within the adaptor ring and a peripheral flange extending radially outward from the cylindrical sleeve-like body over at least a portion of the adaptor ring, the cylindrical sleeve-like body sealingly positioned around the cylindrical sidewall of the hybrid inflator so that a portion of the cylindrical sidewall of the hybrid inflator extends through the adaptor ring, and would extend through the opening in the testing tank and into the test chamber with the plurality of gas discharge ports located within the test chamber of the testing tank.

5. An adaptor system for securing a hybrid inflator, having a cylindrical sidewall terminating at one end in a plurality of gas discharge ports, partially within a test chamber of a testing tank having an opening communicating with the test chamber, the adaptor system comprising;

an adaptor ring sealingly securable to the testing tank over the opening;

an inflator housing having a cylindrical sleeve-like body sealingly fitting within the adaptor ring and a peripheral flange extending radially outward from the cylindrical sleeve-like body over at least a portion of the adaptor ring, the cylindrical sleeve-like body sized to be sealingly positionable around the cylindrical sidewall of the hybrid inflator so that a portion of the cylindrical sidewall of the hybrid inflator would extend through the adaptor ring, the opening in the testing tank and into the test chamber with the plurality of gas discharge ports located within the test chamber of the testing tank;

means for providing a gas-tight seal between the adaptor ring and the testing tank;

means providing a gas-tight seal between the adaptor ring and the inflator housing; and means for providing a gas-tight seal between the sleeve-like body of the inflator housing and the cylindrical sidewall of the hybrid inflator.

6. The adaptor system of claim 5 further comprising:

means for securing the inflator housing within the adaptor ring; and means for securing the hybrid inflator within the sleeve-like body of the inflator housing.

7. The adaptor system of claim 6, wherein the adaptor ring comprises a top surface having a top annular groove and a bottom surface having a bottom annular groove sized to surround the opening in the testing tank;

means for providing a gas tight seal between the adaptor ring and the testing tank comprising a bottom o-ring seated in the bottom annular groove; and means providing a gas-tight seal between the adaptor ring and the peripheral flange of the inflator housing comprising a top o-ring seated in the top annular groove, the peripheral flange of the sleeve-like body sized to cover the top o-ring of the adaptor ring.

8. The adaptor system of claim 7, wherein the sleeve-like body of the adaptor housing further includes an inner annular groove on an inner surface of the cylindrical sleeve-like body; and means for providing a gas-tight seal between the inner surface of the sleeve-like body of the inflator housing and the cylindrical sidewall of the hybrid inflator comprising a housing o-ring seated within the inner annular groove.

9. The adaptor system of claim 8, wherein means securing the inflator housing within the adaptor ring comprises:

a split ring positioned and clampable over the peripheral flange of the inflator housing.

10. The adaptor system of claim 9, wherein means for securing the hybrid inflator within the sleeve-like body of the inflator housing comprises:

tightening means for compressing the split ring around the cylindrical sidewall of the hybrid inflator.

11. A testing tank for partially enclosing and holding a hybrid inflator, having a cylindrical sidewall terminating at one end in a plurality of gas discharge ports, the testing device comprising:

a tank container enclosing a test chamber, said tank container having an opening communicating with the test chamber;

a lid covering the opening in the tank container and having an aperture communicating with the test chamber through the opening;

an adaptor ring secured to the lid surrounding the aperture; and an inflator housing having a cylindrical sleeve-like body slidably fitting within the adaptor ring and a peripheral flange extending radially outward from the cylindrical sleeve-like body over at least a portion of the adaptor ring, the cylindrical sleeve-like body of the inflator housing snugly positionable around the hybrid inflator so that a portion of the cylindrical sidewall of the hybrid inflator would extend through the adaptor ring, the aperture in the lid, the opening in the tank container and into the test chamber with the plurality of gas discharge ports located within the test chamber.

12. The testing tank of claim 11 further comprising:

means providing a gas-tight seal between the tank container and the lid;

means providing a gas-tight seal between the adaptor ring and the lid;

means providing a gas-tight seal between the adaptor ring and the inflator housing; and means for providing a gas-tight seal between the sleeve-like body of the inflator housing and the cylindrical sidewall of the hybrid inflator.

13. The testing tank of claim 12 further comprising:

means securing the inflator housing within the adaptor ring; and means for securing the hybrid inflator within the sleeve-like body of the inflator housing.

14. The testing tank of claim 13, wherein the adaptor ring comprises a top surface having a top annular groove and a bottom surface having a bottom annular groove sized to surround the aperture in the lid; and means providing a gas tight seal between the adaptor ring and the lid comprises a bottom o-ring seated in the bottom annular groove; and means providing a gas-tight seal between the adaptor ring and the inflator housing comprises a top o-ring seated in the top annular groove, the peripheral flange of the sleeve-like body covering the top o-ring of the adaptor ring.

15. The testing tank of claim 14, wherein the sleeve-like body of the inflator housing further includes an inner annular groove on an inner surface of the cylindrical sleeve-like body; and means for providing a gas-tight seal between the sleeve-like body of the inflator housing and the cylindrical sidewall of the hybrid inflator comprises an o-ring seated within the inner annular groove.

16. The testing tank of claim 15, wherein means for securing the inflator housing within the adaptor ring comprises:

a split ring positioned over the peripheral flange of the inflator housing; and a plurality of toggle clamps secured to the lid and surrounding the split ring, clamping the split ring onto the inflator housing.

17. The testing tank of claim 16, wherein the means for securing the hybrid inflator within the sleeve-like body of the inflator housing comprises:

tightening means for compressing the split ring around the cylindrical sidewall of the hybrid inflator.

18. The testing tank of claim 17, wherein the opening of the tank container further includes an annular groove; and means providing a gas-tight seal between the tank container and the lid comprises a tank o-ring seated in the annular groove of the opening of the tank container.

19. A testing tank for partially enclosing and securing a hybrid inflator, having a cylindrical sidewall terminating at one end in a plurality of gas discharge ports, the testing tank comprising:

a tank container enclosing a test chamber, said tank container having an open top communicating with the test chamber, the open top having an annular groove surrounding the open end;

a tank o-ring seated in the annular groove;

a lid secured to the tank container and covering the open top in the tank container and the tank o-ring so that the tank o-ring seals the lid and the open top in a gas-tight manner, the lid having an aperture communicating with the test chamber through the open top;

an adaptor ring secured to the lid surrounding the aperture with a plurality of bolts extending through bolt openings in the adaptor ring and threadedly received in the lid, a top surface of the adaptor ring having a top annular groove and a bottom surface of the adaptor ring having a bottom annular groove sized to surround the aperture in the lid;

a bottom o-ring seated in the bottom annular groove providing a gas-tight seal between the bottom surface of the adaptor ring and the lid;

an inflator housing having a cylindrical sleeve-like body slidably fitting within the adaptor ring and a peripheral flange extending radially outward from the cylindrical sleeve-like body over at least the top annular groove in the top surface of the adaptor ring, the cylindrical sleeve-like body of the inflator housing snugly positionable around the hybrid inflator so that a portion of the cylindrical sidewall of the hybrid inflator will extend through the adaptor ring, the aperture in the lid, the open top in the tank container and into the test chamber with the plurality of gas discharge ports located within the test chamber, the sleeve-like body of the inflator housing having an inner annular groove on an inner surface of the cylindrical sleeve-like body;

a top o-ring seated in the top annular groove of the top surface of the adaptor ring providing a gas-tight seal between the top surface of the adaptor ring and the flange;

a housing o-ring seated within the inner annular groove for providing a gas-tight seal between the inner surface of the sleeve-like body of the inflator housing and the cylindrical sidewall of the hybrid inflator;

a split ring positioned over the peripheral flange of the inflator housing and having two semi-circular halves;

a plurality of screws connecting the two semi-circular halves of the split ring for compressing the two semi-circular halves of the split ring around the cylindrical sidewall of the hybrid inflator;

a plurality of safety bolts having enlarged heads and threadedly received in the top surface of the adaptor ring and surrounding the split ring, the enlarged heads of the safety bolts securing the split ring onto the inflator housing; and a plurality of toggle clamps secured to the lid and surrounding the split ring, the toggle clamps clamping the split ring onto the inflator housing so that the split ring, the safety bolts and the toggle clamps in combination secure the inflator housing within the adaptor ring, and the split ring, the screws, the safety bolts and the toggle clamps in combination for securing the hybrid inflator within the test chamber of the test container.

20. A method for securing and partially enclosing a hybrid inflator for testing thereof, the method comprising:

providing a hybrid inflator having a plurality of gas discharge ports at one end thereof;

providing a testing tank having an opening communicating with an enclosed test chamber;

securing the hybrid inflator partially within the opening of the testing tank in a gas-tight manner so that the plurality of gas discharge ports are located within the enclosed test chamber.

* * * * *